(12) United States Patent
Forbus

(10) Patent No.: US 7,645,395 B2
(45) Date of Patent: *Jan. 12, 2010

(54) VARIABLE TRANSMISSION TRACTION FLUID COMPOSITION

(75) Inventor: Thomas R. Forbus, Lexington, KY (US)

(73) Assignee: Ashland Licensing and Intellectual Property, LLC, Dublin, OH (US)

(*) Notice: Subject to any disclaimer, the term of this patent is extended or adjusted under 35 U.S.C. 154(b) by 229 days.

This patent is subject to a terminal disclaimer.

(21) Appl. No.: 11/499,910

(22) Filed: Aug. 4, 2006

(65) Prior Publication Data

US 2007/0063170 A1    Mar. 22, 2007

Related U.S. Application Data

(60) Provisional application No. 60/705,353, filed on Aug. 4, 2005, provisional application No. 60/709,671, filed on Aug. 22, 2005, provisional application No. 60/791,852, filed on Apr. 13, 2006.

(51) Int. Cl.
*C09K 5/00* (2006.01)
*F16H 15/01* (2006.01)

(52) U.S. Cl. ................... 252/73; 508/208; 585/25; 252/78.3; 476/7

(58) Field of Classification Search ............ 252/73, 252/78.3; 508/208; 585/25; 476/7
See application file for complete search history.

(56) References Cited

U.S. PATENT DOCUMENTS 2,618,601 A * 11/1952 Moreton .................. 508/215
3,445,385 A * 5/1969 Vartanian ................. 252/8.81
3,994,816 A * 11/1976 Wygant .................... 252/73
4,059,534 A * 11/1977 Morro et al. .............. 508/208
4,097,393 A * 6/1978 Cupper et al. ............. 252/78.3
4,190,546 A * 2/1980 Kulik et al. ............... 508/208
4,449,415 A * 5/1984 Groenhof .................. 476/7
4,577,523 A * 3/1986 Groenhof .................. 476/7
4,755,317 A * 7/1988 Minokami et al. ......... 252/73
5,595,680 A    1/1997 Bryant et al.
6,191,330 B1 * 2/2001 Matsuno et al. ........... 585/21

(Continued)

FOREIGN PATENT DOCUMENTS

EP    0 075 327 A2    3/1983

(Continued)

OTHER PUBLICATIONS

Non-Final Official Action directed to U.S. Appl. No. 11/499,838, mailed Jul. 25, 2008.

*Primary Examiner*—Mark Eashoo
*Assistant Examiner*—Jane L Stanley
(74) *Attorney, Agent, or Firm*—Wood, Herron & Evans, LLP

(57) ABSTRACT

The present invention utilizes simple dimethylsilicone fluids of the proper viscosity/molecular weight added to modify the low temperature properties of polycyclic hydrocarbons. One preferred embodiment of a polycyclic hydrocarbon is a perhydro dimer of alpha-methyl styrene. Addition of the dimethylsilicone fluid to the perhydo dimer of alpha-methyl styrene improves the low temperature performance without degrading the requisite low shear stress shear strength properties. Low viscosity dimethylsilicone lubricating fluids combined with polycyclic hydrocarbons are suitable for use in infinitely variable transmissions providing good low temperature flow properties and high shear strength at high temperature and low contact stress conditions.

10 Claims, 1 Drawing Sheet

U.S. PATENT DOCUMENTS

| | | |
|---|---|---|
| 6,242,393 B1 | 6/2001 | Ishida et al. |
| 6,320,088 B1 | 11/2001 | Matsuno et al. |
| 6,602,830 B1 * | 8/2003 | Fey et al. .................... 508/208 |
| 6,623,399 B2 * | 9/2003 | Fey et al. ........................ 476/7 |
| 6,638,417 B2 * | 10/2003 | Ishida et al. .................. 208/19 |
| 6,828,286 B2 | 12/2004 | Komiya et al. |
| 2001/0010293 A1 | 8/2001 | Ishida et al. |
| 2002/0072478 A1 | 6/2002 | Ishida et al. |
| 2003/0220206 A1 | 11/2003 | Komiya et al. |
| 2004/0192562 A1 | 9/2004 | Morita |
| 2005/0026790 A1 | 2/2005 | Komatsubara et al. |

FOREIGN PATENT DOCUMENTS

| | | |
|---|---|---|
| EP | 0 143 462 A2 | 6/1985 |
| EP | 0 699 738 A1 | 3/1996 |
| EP | 0 713 908 A1 | 5/1996 |
| EP | 0 719 853 A2 | 7/1996 |
| EP | 0 721 978 A2 | 7/1996 |
| EP | 0 798 367 A2 | 10/1997 |
| WO | WO 03/057806 A1 | 7/2003 |
| WO | WO 03/057895 A2 | 7/2003 |

* cited by examiner

Infinitely Variable Transmission Fluid Formulations
using Hydrogenated Alpha-Methylstyrene Dimer and Dimethylsilicone Fluids as Base Oils

| Components | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| Hydro AMS Dimer | 80.50 | 80.90 | 81.00 | 81.50 | 82.50 | 80.75 | 75.75 | 70.75 | 65.75 | 81.00 | 81.50 | 80.30 | 81.25 |
| 5 cSt Silicone | 10.00 | 10.00 | 10.00 | 10.00 | 10.00 | | | | | | | | |
| 6 cSt Silicone | | | | | | 10.00 | 15.00 | 20.00 | 25.00 | | | | |
| 10 cSt Silicone | | | | | | | | | | 10.00 | 10.00 | 10.00 | |
| 20 cSt Silicone | | | | | | | | | | | | | 10.00 |
| Additive Package | 9.50 | 9.10 | 9.00 | 8.50 | 7.50 | 9.25 | 9.25 | 9.25 | 9.25 | 9.00 | 8.50 | 9.70 | 8.75 |
| Tests | | | | | | | | | | | | | |
| KV 40C, cSt | 24.68 | 23.21 | 23.14 | 21.58 | 18.97 | 25.75 | 22.26 | 20.15 | 18.37 | 25.19 | 23.62 | 21.37 | 23.87 |
| KV 100C, cSt | 5.25 | 4.96 | 4.91 | 4.59 | 3.93 | 5.37 | 5.04 | 4.88 | 4.77 | 5.28 | 4.88 | 5.72 | 4.98 |
| VI | 152 | 145 | 141 | 114 | 101 | 150 | 143 | 178 | 197 | 160 | 139 | 161 | 147 |
| Brookfield, cP | | | | | | | | | | | | | |
| -30C | 7700 | 7200 | 7700 | 7200 | 6400 | 8400 | 4300 | 2800 | 1600 | 9300 | 8700 | 8400 | 8700 |
| -35C | 18500 | 16600 | 17800 | 17200 | 14800 | 25100 | 17000 | 6150 | 13500 | 22500 | 22400 | 24700 | 21500 |
| -40C | | | | | | | | | | | | | |
| Flash Point, degC | | | | 140 | | | 159 | | | | 159 | | |
| MTM Traction | Traction Coefficients SUS @ 1.25 GPa @ 7.5% Slip & 4 m/s | | | | | | | | | | | | |
| 80C | | | | | | | | | | | 0.098 | | |
| 100C | | | | | | | | | | | 0.088 | | |
| 120C | | | | | | | | | | | 0.071 | | |
| 140C | | | | | | | | | | | 0.066 | | |
| | Traction Coefficients SUS @ 1.25 GPa @ 7.5% Slip & 2 m/s | | | | | | | | | | | | |
| 80C | | | | | | | 0.095 | | | | 0.099 | | |
| 100C | | | | | | | 0.084 | | | | 0.089 | | |
| 120C | | | | | | | 0.073 | | | | 0.078 | | |
| 140C | | | | | | | 0.063 | | | | 0.066 | | |
| | Traction Coefficients SUS @ 1.00 GPa @ 7.5% Slip & 4 m/s | | | | | | | | | | | | |
| 80C | | | | | | | | | | | 0.093 | | |
| 100C | | | | | | | | | | | 0.081 | | |
| 120C | | | | | | | | | | | 0.067 | | |
| 140C | | | | | | | | | | | 0.053 | | |
| | Traction Coefficients SUS @ 1.00 GPa @ 7.5% Slip & 2 m/s | | | | | | | | | | | | |
| 80C | | | | | | | 0.089 | | | | 0.095 | | |
| 100C | | | | | | | 0.075 | | | | 0.078 | | |
| 120C | | | | | | | 0.061 | | | | 0.063 | | |
| 140C | | | | | | | 0.050 | | | | 0.053 | | |

| Components | Example 14 | Example 15 | Example 16 | Example 17 | Example 18 | Example 19 | Example 20 | Example 21 | Example 22 | Example 23 | Example 24 | Example 25 | Santotrac 50 |
|---|---|---|---|---|---|---|---|---|---|---|---|---|---|
| Hydro AMS Dimer | 76.25 | 71.25 | 66.25 | 70.75 | 82.50 | 81.25 | 76.25 | 71.25 | 66.25 | 82.50 | 77.50 | 72.50 | |
| 5 cSt Silicone | | | | | | | | | | | | | |
| 6 cSt Silicone | | | | | | | | | | | | | |
| 10 cSt Silicone | 15.00 | 20.00 | 25.00 | 20.00 | 10.00 | | | | | | | | |
| 20 cSt Silicone | | | | | | 10.00 | 15.00 | 20.00 | 25.00 | 10.00 | 15.00 | 20.00 | |
| Additive Package | 8.75 | 8.75 | 8.75 | 9.25 | 7.50 | 8.75 | 8.75 | 8.75 | 8.75 | 7.50 | 7.50 | 7.50 | |
| Tests | | | | | | | | | | | | | |
| KV 40C, cSt | 22.16 | 20.30 | 18.75 | 21.62 | 20.46 | 26.66 | 24.97 | 23.70 | 22.55 | 22.37 | 21.21 | 20.35 | 28.61 |
| KV 100C, cSt | 4.96 | 4.84 | 4.76 | 5.16 | 4.22 | 5.42 | 5.48 | 5.51 | 5.61 | 4.55 | 4.61 | 4.77 | 5.25 |
| VI | 157 | 172 | 189 | 182 | 110 | 144 | 165 | 183 | 206 | 119 | 138 | 147 | 116 |
| Brookfield, cP | | | | | | | | | | | | | |
| -30C | 4800 | 3100 | 1900 | 3100 | 7600 | 14900 | 12400 | 8100 | 3000 | 13100 | 11900 | 8400 | 31200 |
| -35C | 10740 | 6420 | 3710 | 6430 | 17700 | 53400 | 43700 | 29550 | 4730 | 48850 | 36250 | 29150 | 98000 |
| -40C | | | | | | | | | | | | | 243000 |
| Flash Point, degC | | | | | | | | | | | | | |
| MTM Traction | Traction Coefficients SUS @ 1.25 GPa @ 7.5% Slip & 4 m/s | | | | | | | | | | | | |
| 80C | | | | | 0.092 | 0.099 | | | | | | | 0.104 |
| 100C | | | | | 0.082 | 0.089 | | | | | | | 0.096 |
| 120C | | | | | 0.071 | 0.078 | | | | | | | 0.085 |
| 140C | | | | | 0.060 | 0.067 | | | | | | | 0.075 |
| | Traction Coefficients SUS @ 1.25 GPa @ 7.5% Slip & 2 m/s | | | | | | | | | | | | |
| 80C | | | | | 0.093 | 0.100 | | | | | | | 0.106 |
| 100C | | | | | 0.082 | 0.089 | | | | | | | 0.098 |
| 120C | | | | | 0.071 | 0.076 | | | | | | | 0.085 |
| 140C | | | | | 0.060 | 0.065 | | | | | | | 0.074 |
| | Traction Coefficients SUS @ 1.00 GPa @ 7.5% Slip & 4 m/s | | | | | | | | | | | | |
| 80C | | | | | 0.084 | 0.095 | | | | | | | 0.102 |
| 100C | | | | | 0.073 | 0.081 | | | | | | | 0.090 |
| 120C | | | | | 0.058 | 0.067 | | | | | | | 0.077 |
| 140C | | | | | 0.044 | 0.054 | | | | | | | 0.064 |
| | Traction Coefficients SUS @ 1.00 GPa @ 7.5% Slip & 2 m/s | | | | | | | | | | | | |
| 80C | | | | | 0.086 | 0.095 | | | | | | | 0.106 |
| 100C | | | | | 0.072 | 0.081 | | | | | | | 0.090 |
| 120C | | | | | 0.058 | 0.067 | | | | | | | 0.076 |
| 140C | | | | | 0.046 | 0.053 | | | | | | | 0.065 |

Examples 20-25 utilizing 20 centistoke dimethylsilicone oil were cloudy when cooled to -30C and below

FIG 1

VARIABLE TRANSMISSION TRACTION FLUID COMPOSITION

CROSS REFERENCE TO RELATED APPLICATIONS

This application claims priority from U.S. Provisional Application Ser. No. 60/705,353 filed on Aug. 4, 2005 and U.S. Provisional Application Ser. No. 60/709,671 filed on Aug. 22, 2005 and U.S. Provisional Application Ser. No. 60/791,852 filed on Apr. 13, 2006 all of which are incorporated by reference in their entirety. The present invention is related to U.S. application Ser. No. 11/499,838, filed on Aug. 4, 2006.

FIELD OF THE INVENTION

The invention relates to the field of providing a low viscosity dimethylsilicone fluids suitable for use in infinitely variable transmissions providing a balance of good low temperature flow properties and high elastohydrodynamic (EHD) shear strength.

BACKGROUND OF THE INVENTION

An infinite variable transmission is a for of a traction drive which is a device whereby torque is transmitted from one smooth rolling element to another and typically the rolling elements are in nominal point or line contact. Variable speed traction drives can be made by proper selection of the number, size, shape and geometrical configuration of the roller elements typically comprising one or more parallel cylindrical elements spaced apart from one another. Variable speed transmissions provide a means for smooth and quiet operation and increased fuel efficiency.

For example, infinitely variable transmission ("IVT") are configured to provide a continuous range of ratio from reverse through stationary to high overdrive utilizing a variator comprising a set of discs and rollers. The rollers do not touch the discs and there is no metal to metal contact, but are separated by traction fluid.

The variable speed transmission, (traction fluid), behaves as a lubricant and coolant in the variable speed transmission. The fluid is required to exhibit high pressure and high shear conditions found I the area of contact between the plate or roller elements which are separated by a thin film of the fluid. The fluids resistance to shear provides the torque transmitting ability of the fluid composition. The torque transmitting ability of the fluid composition can be measured by its traction coefficient.

Traction fluid works by rolling the edge of the roller against the surface of the discs which traps a microscopic oil film between them. The long chain molecules of the traction fluid interlock with one another when the fluid is compressed and becomes highly viscous under pressure. Thus, as pressure is exerted at the contact points between the roller and/or discs the oil "traction fluid" resists the tendency to slip and transmits the power effectively.

DESCRIPTION OF THE PRIOR ART

An infinitely variable speed transmission (traction drive) fluid has similar responsibilities to normal (geared) transmission (i.e. automatic transmission) fluids in that it must serve as a lubricant, coolant, and in some cases, hydraulic fluid. A traction or infinitely variable transmission (IVT) fluid has the added responsibility of transmitting torque from an input devise to the output through the lubricating film that it forms in the contact(s) between smooth rolling-sliding rotating elements of the transmission. Thus the fluid is required to exhibit high shear strength in the high shear stress EHD conditions found in the area of contact between the rolling-sliding drive elements which are separated and lubricated by a thin film of the IVT fluid. The fluid's resistance to shear (shear strength) in the contact provides the torque transmitting capability of the fluid composition.

Lubricating fluids suitable for use in infinitely variable transmissions for most equipment employed in outdoor applications need a critical balance of good low temperature flow properties and high EHD shear strength; and, particularly shear strength at a combination of high temperatures and low contact stresses. Cycloaliphatic hydrocarbons generally have superior shear strength properties but very poor low temperature properties compared to more typical hydrocarbon-based fluids employed for producing good lubricants. Other fluids with good low temperature properties can be incorporated which improve the low temperature properties of the mixture but generally these cause significant undesirable loss of the shear strength properties. It has now been found that simple low-viscosity dimethylsilicone fluids can accomplish the desired balance of these properties.

Infinite variable transmissions generally need a critical balance of good low temperature flow properties and high shear strength at a combination of high temperature and low contact stress. Cycloaliphatic hydrocarbons generally have good performance of the latter but poor low temperature properties. Other fluids with good low temperature properties can be incorporated which improve the low temperature properties of the mixture but generally these cause significant undesirable loss of the shear strength properties.

Conventional compositions of dimethylsilicone fluids exhibit poor hydrocarbon solubility which often limited its utility. Thus, these conventional dimethylsilicone fluids were used with other functionality beside all or mostly methyl in an effort to avoid a potential incompatibility issue.

Mixed aliphatic, cycloaliphatic and aromatic containing silicone fluids have been used for traction fluids; however the utilization of simple dimethylsilicone fluids as low temperature flow improver is not been utilized for variable transmission applications prior to applicant's instant invention. As set forth in U.S. Pat. No. 4,449,415 by Groenhof which issued in May of 1984 and is incorporated by reference herein teaches that siloxanes in general have traction coefficients too low to be useful in traction drive devices. Moreover, the Groenhof reference teaches the use of 30 to 100 percent by weight of a trimethylsiloxy end blocked siloxane fluid and 30 to 70 percent by weight of a cycloaliphatic hydrocarbon or a mixture of cycloaliphatic hydrocarbons. U.S. Pat. No. 4,577,523 to Groenhof which issued in Mar. 25, 1986 and is hereby incorporated by reference herein teaches the use of polyorganosiloxane traction fluids suitable for use at low temperatures. U.S. Pat. No. 6,602,830 by Fey et al. and is incorporated herein issued in August of 2003 and teaches the use of blends of organic oils and siloxane compositions because the organic oils tend to get very viscous at low temperatures.

Other uses involved incorporating a third fluid such as an aromatic hydrocarbon or ester in the mixture to solubilize the dimethylsilicone fluids in the hydrocarbon fluids as set forth in the following references: U.S. Pat. No. 4,190,546 by Kulik et al. issued on Feb. 26, 1980 and utilizes a naphthenic hydrocarbon, (cycloaliphatic hydrocarbon), or mixture thereof together with a co-solvent and silicone fluid wherein the co-solvent is required to ensure complete miscibility of the silicone and naphthenic fluid.

One of the bases of this concept, improvement of low temperature properties of cycloaromatic fluids with silicone fluids is not new. Many types of aliphatic, cycloaliphatic and aromatic containing silicone fluids have been reported for this purpose and specifically for traction fluids. However, no report has been found that introduces just simple dimethylsilicone fluids as low temperature improvers. One reason may be the generally poor hydrocarbon solubility of most dimethylisilicone fluids which could be construed as limiting their utility. Therefore, other inventors have focused on silicone fluids containing other functional besides mainly aromatics in an effort to avoid the perceived incompatibility issue; or, have resorted to incorporation a third component fluid in traction fluid formulations, such as aliphatic hydrocarbons or esters in the mixture to induce the compatibility of the dimethylsilicone fluid in the hydrocarbon fluid.

These traction fluids which consist essentially of cycloaromatic hydrocarbon in combination with the dimethylsilicone fluids serve as base oils to which additional additives may be added to form fully-formulated automatic transmission fluids for infinitely variable transmission fluids. These additives include antioxidant agents, antiwear agents, extreme pressure agents, detergents, dispersants, antifoamer, anti-rust agents, friction modifiers, and viscosity modifier additives. The silicone oil for the purposes of the instant invention used may consist essentially of up to but less than 10% other appropriate functional groups, longer-chain aliphatic, cycloaliphatic, or combinations of these functionalities besides methyls to further enhance performance and the performance of the fully-blended traction drive or infinitely variable transmission fluid.

The present invention is applicable in variable transmission fluids and the examples and further discussion will focus on variable transmission fluids; however, the claims are applicable to the power transmission fluids, hydraulic steering fluids, and other types of oil based noncompressible fluids as well.

SUMMARY OF THE INVENTION

The present invention utilizes simple dimethylsilicone fluids of the proper viscosity/molecular weight added to modify the low temperature properties of polycyclic hydrocarbons. One preferred embodiment of a polycyclic hydrocarbon is a perhydro dimer of alpha-methyl styrene. Addition of the dimethylsilicone fluid to the perhydo dimer of alpha-methyl styrene improves the low temperature performance without degrading the requisite low shear stress shear strength properties.

A preferred viscosity range for the dimethysilicone fluid is less than 20 centistokes and more preferably from about 5 to 15 centistokes at 77° F., (or about 2 to 10 centistokes at 100° C.). Higher viscosities, (20 centistokes or more at 77° F.), dimethylsilicone oils are not fully miscible in the required low temperatures regime of −20° C. and below and are not suitable for modification of the polycyclic hydrocarbons for traction fluid applications of the present invention.

Furthermore, dimethylsilicone fluids have a relatively low volatility even at very low viscosity grades. Thus, the Flash and Fire points (D92 and D93) are not compromised from the level of the perhydro dimer of alpha-methyl styrene base oil of about 160° C. Additionally, the low temperature viscosmetrics of the product are substantially modified by limited co-blending of light dimethysilicone fluids into the cyclic hydrocarbon oil without substantial reduction of the high temperature, low shear stress, shear strengths of the blended fluids.

Utilization of the instant formulation allows a fully formulated infinitely variable transmission traction fluid having from about 3.5 to about 6.0 centistocks at 100° C. to be formulated that have −30° C. Brookfield viscosities of 40 poise which do not unduly compromise shear strength properties.

These traction fluids which contain the polycyclic hydrocarbon such as the perhydro dimer of alpha-methystyrene in combination with the dimethylsilicone fluids serve as base oils to which additional additives may be added to form fully-formulated automatic transmission fluids for infinitely variable transmission fluids. These additives include antioxidant agents, antiwear agents, extreme pressure agents, detergents, dispersants, anti-foamer, anti-rust agents, friction modifiers, and viscosity modifier additives.

The silicone oil used may contain up to 10 percent by weight of other functional groups besides methyl to further enhance the performance of the full blended infinitely variable transmission fluids.

The present invention relates to a traction drive system which comprises at least two relatively rotatable members in a torque-transmitting relationship and a traction fluid disposed on the tractive surfaces of the members, said traction fluid consisting essentially of a perhydro dimer of alpha-methyl styrene and a dimethylsilicone fluid having a viscosity of less than 20 centistokes at 77° F.

More particularly, the present invention also relates to an improved traction drive system having at least two relatively rotatable members in a torque transmitting relationship and a traction fluid disposed on the tractive surfaces of the rotatable members, whereby the improvement employing a traction fluid consisting essentially of comprising a polycyclic hydrocarbon and a dimethylsilicone fluid having a viscosity of less than 20 centistokes at 77° F., wherein the polycyclic hydrocarbon is a perhydro dimer of alpha-methyl styrene.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein FIG. 1 is a table of properties and performance data showing the effect of dimethicone on low temperature properties of aromatic based lubricant formulations.

DESCRIPTION OF THE PREFERRED EMBODIMENT

The present invention provides a traction fluid base stock having the low temperature properties of polycyclic hydrocarbons and the low shear stress shear strength properties of a dimethylsilicone fluid. Additives provide the desired properties to formulate a infinity variable transmission fluid that gives a high thermal conductivity and improved heat transfer capability compared to conventional fluids of the same medium. In the present invention the fluid medium is targeted in its viscosity, friction, and antioxidant characteristics to perform in modern infinite variable transmissions.

Oil Basestocks

The present invention utilizes a perhydro dimer of alpha-methyl styrene as a hydrocarbon fluid which exhibits a low viscosity with very good shear strength properties; however, it has very poor low temperature flow properties. Use of the perhydro dimer of alpha-methyl styrene in traction fluid applications requires significant flow modification to maintain its viscosity in acceptable range for use in infinitely variable transmission applications.

The present invention utilizes simple dimethylsilicone fluids of the proper viscosity/molecular weight added to modify the low temperature properties of polycyclic hydrocarbons. One preferred embodiment of a polycyclic hydrocarbon is a perhydro dimer of alpha-methyl styrene. Addition of the dimethylsilicone fluid to the perhydo dimer of alpha-methyl styrene improves the low temperature performance without degrading the requisite low shear stress shear strength properties.

A preferred viscosity range for the dimethysilicone fluid is less than 20 centistokes and more preferably from about 5 to 15 centistokes at 77° F., (or about 2 to 10 centistokes at 100° C.). Higher viscosities, (20 centistokes or more at 77° F.), dimethylsilicone oils are not fully miscible in the required low temperatures regime of −20° C. and below and are not suitable for modification of the polycyclic hydrocarbons for traction fluid applications of the present invention.

Furthermore, dimethylsilicone fluids have a relatively low volatility even at very low viscosity grades. Thus, the Flash and Fire points (D92 and D93) are not compromised from the level of the perhydro dimer of alpha-methyl styrene base oil of about 160° C. Additionally, the low temperature viscosmetrics of the product are substantially modified by limited co-blending of light dimethysilicone fluids into the cyclic hydrocarbon oil without substantial reduction of the high temperature, low shear stress, shear strengths of the blended fluids.

Utilization of the instant formulation allows a fully formulated infinitely variable transmission traction fluid having from about 3.5 to about 6.0 centistocks at 100° C. to be formulated that have −30° C. Brookfield viscosities of 40 poise which do not unduly compromise shear strength properties.

These traction fluids which comprise the polycyclic hydrocarbon such as the perhydro dimer of alpha-methystyrene in combination with the dimethylsilicone fluids serve as base oils to which additional additives may be added to form fully-formulated automatic transmission fluids for infinitely variable transmission fluids. These additives include antioxidant agents, antiwear agents, extreme pressure agents, detergents, dispersants, antifoamer, anti-rust agents, friction modifiers, and viscosity modifier additives.

The dimethylsilicone oil used may contain up to 10 percent by weight of other functional groups besides methyl to further enhance the performance of the full blended infinitely variable transmission fluids.

The following examples provide support for the formulation of infinitely variable transmission base oil fluid formulations. The control or standard to which the traction fluid base composition of the instant invention is compared is for SANTOTRAC 50 which is used as a reference fluid in industry for high shear strength properties.

Dispersants Used in Lubricant Industry

Dispersants used in the lubricant industry are typically used to disperse the "cold sludge" formed in gasoline and diesel engines, which can be either "ashless dispersants", or containing metal atoms. They can be used in the instant invention since they are found to be an excellent dispersing agent. They are also needed to disperse wear debris and products of lubricant degradation within the transmission.

The ashless dispersants commonly used in the automotive industry contain an lipophilic hydrocarbon group and a polar functional hydrophilic group. The polar functional group can be of the class of carboxylate, ester, amine, amide, imine, imide, hydroxyl, ether, epoxide, phosphorus, ester carboxyl, anhydride, or nitrile. The lipophilic group can be oligomeric or polymeric in nature, usually from 70 to 200 carbon atoms to ensure oil solubility. Hydrocarbon polymers treated with various reagents to introduce polar functions include products prepared by treating polyolefins such as polyisobutene first with maleic anhydride, or phosphorus sulfide or chloride, or by thermal treatment, and then with reagents such as polyamine, amine, ethylene oxide, etc.

Of these ashless dispersants the ones typically used in the petroleum industry include N-substituted polyisobutenyl succinimides and succinates, alkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides. Preferred oil-based dispersants that are most important in the instant application include dispersants from the chemical classes of alkylsuccinimide, succinate esters, high molecular weight amines, Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, bis-hydroxypropyl phosphorate. Commercial dispersants suitable for transmission fluid are for example, Lubrizol 890 (an ashless PIB succinimide), Lubrizol 6420 (a high molecular weight PIB succinimide), ETHYL HITEC 646 (a non-boronated PIB succinimide). The dispersant may be combined with other additives used in the lubricant industry to form a ispersant-detergent (DI) additive package for transmission fluids, e.g., LUBRIZOL 9677MX, and the whole DI package can be used as dispersing agent Other Types of Dispersants Alternatively a surfactant or a mixture of surfactants with low HLB value (typically less than or equal to 8), preferably nonionic, or a mixture of nonionics and ionics, may be used in the instant invention.

The dispersants selected should be soluble or dispersible in the liquid medium. The dispersant can be in a range of up from 0.01 to 30 percent, more preferably in a range of from between 0.5 percent to 20 percent, more preferably in a range of from between 1 to 15 percent, and most preferably in a range of from between 2 to 13 percent.

Other Chemical Compounds

This dispersion may also contain a large amount of one or more other chemical compounds, preferably polymers, not for the purpose of dispersing, but to achieve thickening or other desired fluid characteristics. These can be added but reduce the amount of particulate that can be used without excessive thickening.

The viscosity improvers used in the lubricant industry can be used in the instant invention for the oil medium, which include olefin copolymers (OCP), polymethacrylates (PMA), hydrogenated styrene-diene (STD), and styrene-polyester (STPE) polymers. Olefin copolymers are rubber-like materials prepared from ethylene and propylene mixtures through vanadium-based Ziegler-Natta catalysis. Styrene-diene polymers are produced by anionic polymerization of styrene and butadiene or isoprene. Polymethacrylates are produced by free radical polymerization of alkyl methacrylates. Styrene-polyester polymers are prepared by first co-polymerizing styrene and maleic anhydride and then esterifying the intermediate using a mixture of alcohols.

Other compounds which can be used in the instant invention in the oil medium include: acrylic polymers such as polyacrylic acid and sodium polyacrylate, high-molecular-weight polymers of ethylene oxide such as Polyox WSR from Union Carbide, cellulose compounds such as carboxymethylcellulose, polyvinyl alcohol (PVA), polyvinyl pyrrolidone (PVP), xanthan gums and guar gums, polysaccharides, alkanolamides, amine salts of polyamide such as DISPARLON AQ series from King Industries, hydrophobically modified ethylene oxide urethane (e.g., ACRYSOL series from Rohmax), silicates, and fillers such as mica, silicas, cellulose, wood flour, clays (including organoclays) and clays, and resin polymers such as polyvinyl butyral resins, polyurethane resins, acrylic resins and epoxy resins.

Chemical compounds such as seal swell agents or plasticizers can also be used in the instant invention and may be selected from the group including phthalate, Adipate, sebacate esters, and more particularly: glyceryl tri(acetoxystearate), epoxidized soybean oil, epoxidized linseed oil, N,n-butyl benzene sulfonamide, aliphatic polyurethane, epoxidized soy oil, polyester glutarate, polyester glutarate, triethylene glycol caprate/caprylate, long chain alkyl ether, dialkyl diester glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12/PEG-65 lanolin oil, dialkyl adipate, alkylaryl phosphate, alkyl diaryl phosphate, modified triaryl phosphate, triaryl phosphate, butyl benzyl phthalate, octyl benzyl phthalate. alkyl benzyl phthalate, dibutoxy ethoxy ethyl adipate, 2-ethylhexyldiphenyl phosphate, dibutoxy ethoxy ethyl formyl, diisopropyl adipate, diisopropyl sebacate, isodecyl oleate, neopentyl glycol dicaprate, neopentyl glycol diotanoate, isohexyl neopentanoate, ethoxylated lanolins, polyoxyethylene cholesterol, propoxylated (2 moles) lanolin alcohols, propoxylated lanoline alcohols, acetylated polyoxyethylene derivatives of lanoline, and dimethylpolysiloxane. Other plasticizers which may be substituted for and/or used with the above plasticizers including glycerine, polyethylene glycol, dibutyl phthalate, and 2,2,4-trimethyl-1,3-pentanediol monoisobutyrate, and diisononyl phthalate all of which are soluble in a solvent carrier. Other seal swelling agents such as Lubrizol 730 can also be used.

Antioxidants are an important part of transmission fluids. General classes include zinc dialkyldithiophosphates, alkyl and aryl phenols, alkyl and aryl amines, and sulfurized olefins. Commercial examples are CIBA L57 (phenyl amine) and ETHYL HITEC 1656.

Pour point depressants, either of polymethyl methacrylate or ethylene propylene olefin co-polymer type are useful to decrease the low temperature Brookfield viscosity of the fluid. Examples include ROHMAX 3008, ROHMAX 1-333, LUBRIZOL 6662A.

Friction Modifiers are used to control friction and torque characteristics of the fluid. Commercial examples include LUBRIZOL 8650 and HITEC 3191.

EXAMPLES

FIG. 1 sets forth infinitely variable transmission fluid formulations containing polycyclic "aromatic" hydrocarbons in combination with a dimethylsilicone fluid and the performance characteristics of each composition.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above.

I claim:

1. In a traction drive system having at least two relatively rotatable members in a torque transmitting relationship and a traction fluid disposed on the tractive surfaces of said members, the improvement employing as said traction fluid, a fluid consisting essentially of:
   a perhydro dimer of alpha-methyl styrene; and
   a dimethylsilicone fluid having a viscosity of less than 20 centistokes at 77° F., wherein said dimethylsilicone fluid constitutes between about 10% by weight and about 25% by weight of said traction fluid and said dimethylsilicone fluid contains not more than 10% by weight of functional groups other than a methyl group.

2. The traction drive system traction fluid of claim 1 further including a dispersant.

3. In a traction drive system having at least two relatively rotatable members in a torque transmitting relationship and a traction fluid disposed on the tractive surfaces of said members, the improvement comprising employing as said traction fluid, a fluid comprising:
   a perhydro dimer of alpha-methyl styrene; and
   a dimethylsilicone fluid having a viscosity in a range of from 5 to 15 centistokes at 77%, wherein said dimethylsilicone fluid constitutes between about 10% by weight and about 25% by weight of said traction fluid and said dimethylsilicone fluid contains not more than 10% by weight of functional groups other than a methyl group.

4. The traction drive system traction fluid of claim 3 further including a dispersant.

5. A traction drive system containing at least two relatively rotatable members in a torque-transmitting relationship and a traction fluid disposed on the tractive surfaces of said members, said traction fluid consisting essentially of:
   a polycyclic hydrocarbon; and
   a dimethylsilicone fluid having a viscosity of less than 20 centistokes at 77%, wherein said dimethylsilicone fluid constitutes between about 10% by weight and about 25% by weight of said traction fluid and said dimethylsilicone fluid contains not more than 10% by weight of functional groups other than a methyl group.

6. The traction drive system traction fluid of claim 5, wherein said polycyclic hydrocarbon is a perhydro dimer of alpha-methyl styrene.

7. The traction drive system traction fluid of claim 5 further including a dispersant.

8. A traction drive system which comprises at least two relatively rotatable members in a torque-transmitting relationship and a traction fluid disposed on the tractive surfaces of said members, said traction fluid comprising:
   a polycyclic hydrocarbon; and
   a dimethylsilicone fluid having a viscosity of from between 5 and 15 centistokes at 77%, wherein said dimethylsilicone fluid constitutes between about 10% by weight and about 25% by weight of said traction fluid and said dimethylsilicone fluid contains not more than 10% by weight of functional groups other than a methyl group.

9. The traction drive system traction fluid of claim 8, wherein said polycyclic hydrocarbon is a perhydro dimer of alpha-methyl styrene.

10. The traction drive system traction fluid of claim 8 further including a dispersant.

* * * * *

UNITED STATES PATENT AND TRADEMARK OFFICE
CERTIFICATE OF CORRECTION

| | |
|---|---|
| PATENT NO. | : 7,645,395 B2 |
| APPLICATION NO. | : 11/499910 |
| DATED | : January 12, 2010 |
| INVENTOR(S) | : Thomas R. Forbus |

It is certified that error appears in the above-identified patent and that said Letters Patent is hereby corrected as shown below:

Specification

Col. 1, lines 18-19, "The invention relates to the field of providing a low viscosity dimethylsilicone fluids suitable for" should read --The invention relates to the field of providing low viscosity dimethylsilicone fluids suitable for--.

Col. 1, line 36, "infinitely variable transmission ("IVT"0" should read --infinitely variable transmissions ("IVTs")--.

Col. 1, line 42, "The variable speed transmission, (traction fluid), behaves" should read --The variable speed transmission traction fluid behaves--.

Col. 1, line 45, "conditions found I the area of contact" should read --conditions found in the area of contact--.

Col. 2, line 1, "devise to the" should read --device to the--.

Col. 2, line 42, "is not been utilized for" should read --has not been utilized for--.

Col. 3, line 11, "fluids containing other functional besides" should read --fluids containing other functional groups besides--.

Col. 3, line 25, "oil for the purposes of the instant invention used may" should read --oil for the purposes of the instant invention may--.

Col. 4, line 8, "alpha-methystyrene" should read --alpha-methylstyrene--.

Col. 4, line 32, "fluid consisting essentially of comprising a" should read --fluid comprising a--.

Signed and Sealed this
First Day of March, 2016

Michelle K. Lee
*Director of the United States Patent and Trademark Office*

CERTIFICATE OF CORRECTION (continued)
U.S. Pat. No. 7,645,395 B2

Col. 4, line 41, "BRIEF DESCRIPTION OF THE DRAWINGS" should read --BRIEF DESCRIPTION OF THE DRAWING--.

Col. 4, line 45, "with the accompanying drawings" should read --with the accompanying drawing--.

Col. 5, line 39, "alpha-methystyrene" should read --alpha-methylstyrene--.

Col. 5, line 67, "industry contain an" should read --industry contain a--.

Col. 7, line 32, "diotanoate" should be --dioctanoate--.

Claims

Col. 8, line 26, claim 3, "77%" should be --77 degrees F.--.

Col. 8, line 40, claim 5, "77%" should be --77 degrees F.--.

Col. 8, line 56, claim 8, "77%" should be --77 degrees F.--.